United States Patent
Butovitsch et al.

(10) Patent No.: US 6,792,276 B1
(45) Date of Patent: Sep. 14, 2004

(54) HOT SPOT WITH TAILORED RANGE FOR EXTRA FREQUENCY TO MINIMIZE INTERFERENCE

(75) Inventors: Peter Butovitsch, Bromma (SE); Lars B. Johansson, Linkoping (SE); Walter Muller, Upplands Vasby (SE); Petter Blomberg, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 09/605,638

(22) Filed: Jun. 28, 2000

Related U.S. Application Data (60) Provisional application No. 60/143,523, filed on Jul. 13, 1999.

(51) Int. Cl.$^7$ ................................................. H04Q 7/20
(52) U.S. Cl. ....................... 455/453; 455/438; 455/442; 455/444
(58) Field of Search ........................ 455/453, 436–437, 455/443–444, 13.4, 446, 448, 67.1, 63, 561; 370/332

(56) References Cited

U.S. PATENT DOCUMENTS

| | | | |
|---|---|---|---|
| 5,357,559 A | * 10/1994 | Kallin et al. | 379/59 |
| 5,546,443 A | 8/1996 | Raith | |
| 5,615,215 A | * 3/1997 | Utting et al. | 370/337 |
| 5,878,349 A | 3/1999 | Dufour et al. | |
| 5,920,819 A | * 7/1999 | Asanuma | 455/447 |
| 5,924,036 A | * 7/1999 | Gustafson | 455/447 |
| 6,021,125 A | * 2/2000 | Sakoda et al. | 370/345 |
| 6,081,714 A | * 6/2000 | Wakizaka | 455/437 |
| 6,101,176 A | * 8/2000 | Honkasalo et al. | 370/335 |
| 6,131,015 A | * 10/2000 | Hill et al. | 455/69 |
| 6,212,405 B1 | * 4/2001 | Jiang et al. | 455/561 |
| 6,317,600 B1 | * 11/2001 | Salonaho et al. | 455/453 |
| 6,529,491 B1 | * 3/2003 | Chang et al. | 370/335 |

FOREIGN PATENT DOCUMENTS

EP           0 817 517 A1       1/1998

OTHER PUBLICATIONS

US 5,615,125, 3/1997, Utting (withdrawn)*
International Search Report dated Dec. 11, 2000.
IEEE Transactions on Vehicular Technology, vol. 48, No. 1, Jan. 1999: "Performance Study for a Microcell Hot Spot Embedded in CDMA Macrocell Systems", pp. 47–59.
IEEE, 1996, Kohji Takeo: "Improvement of Coverage Probability by Subband Scheme in CDMA Macro–micro Cellular System", pp. 93–97.
Mobile and Personal Communications, Conference Publication No. 387, Dec. 1993: "Muli–Rate DS–CDMA Radio Interface for Third–Generation Cellular Systems", pp. 13–15.

* cited by examiner

*Primary Examiner*—William Trost
*Assistant Examiner*—Brandon Miller (57) ABSTRACT

A method and apparatus for minimizing interference in a wireless communication system. A base transceiver station transmits and receives over a first frequency band and a second frequency band. The maximum range of the first frequency band can be smaller than the maximum range of the second frequency band. Alternatively, the maximum range of the first frequency band can be larger than the maximum range of the second frequency band. Further, the maximum range of the second frequency band can vary based upon factors such as the capacity of the first frequency band and the amount of interference on the first frequency band. A control channel for the second frequency band which is measured for determining whether to handoff from the first frequency band to the second frequency band can be transmitted within the first frequency band.

30 Claims, 7 Drawing Sheets

HOT SPOT WITH TAILORED RANGE FOR EXTRA FREQUENCY TO MINIMIZE INTERFERENCE

This application claims the benefit of provisional application No. 60/143,523 filed Jul. 13, 1999.

BACKGROUND

The present invention relates to increasing the capacity of a cellular system, and more specifically, to increasing the capacity of a cell without causing an increased amount of interference to connections in the system.

Continuing growth in telecommunications is placing increasing stress on the capacity of cellular systems. The limited frequency spectrum made available for cellular communications demands cellular systems having increased network capacity and adaptability to various communications traffic situations. Although the introduction of digital modulation to cellular systems has increased system capacity, these increases alone may be insufficient to satisfy added demand for capacity and radio coverage. Other measures to increase capacity, such as decreasing the size of cells in metropolitan areas, may be necessary to meet growing demand.

Interference between communication cells located near one another creates additional problems, particularly when relatively small cells are utilized. Thus, techniques are necessary for minimizing interference between cells. One known technique used in TDMA and FDMA systems is to group cells into "clusters". Within individual clusters, communications frequencies are allocated to particular cells in a manner which attempts to maximize the uniform distance between cells in different clusters which use the same communications frequencies. This distance is commonly referred to as the "frequency reuse" distance. As this distance increases, the interference between a cell using a communication frequency and a distant cell using that same frequency is reduced.

Another method of increasing capacity while reducing interference is through the use of spread spectrum modulation and code division multiple access (CDMA) techniques. In typical direct sequence CDMA systems, an information data stream to be transmitted is superimposed on a much-higher-symbol-rate data stream, sometimes known as a spreading sequence. Each symbol of the spreading sequence is commonly referred to as a chip. Each information signal is allocated a unique spreading code that is used to generate the spreading sequence typically by periodic repetition. The information signal and the spreading sequence are typically combined by multiplication in a process sometimes called coding or spreading the information signal. A plurality of spread information signals are transmitted as modulations of radio frequency carrier waves and are jointly received as a composite signal at a receiver. Each of the spread signals overlaps all of the other coded signals, as well as noise-related signals, in both frequency and time. By correlating the composite signal with one of the unique spreading sequences, the corresponding information signal can be isolated and decoded. Since signals in CDMA systems overlay one another in frequency and time they are frequently said to be self-interfering.

One method of reducing self-interference in a CDMA cellular system is through the use of power control. Power control in cellular systems is based upon the premise that as the distance between the mobile station and the base transceiver station decreases, the amount of transmit power needed for the mobile station or the base transceiver station to receive an acceptable signal will also decrease. Similarly, as the distance between the base transceiver station and the mobile station increases, the amount of transmit power needed for the mobile station or the base transceiver station to receive an acceptable signal will also increase. As the magnitude of the transmit power is increased, so to does the amount of interference caused to other connections in the cellular system. Accordingly, by using only the amount of power necessary to transmit signals between base transceiver stations and mobile stations, the amount of interference caused to other connections in the system will be decreased.

Figure 1:
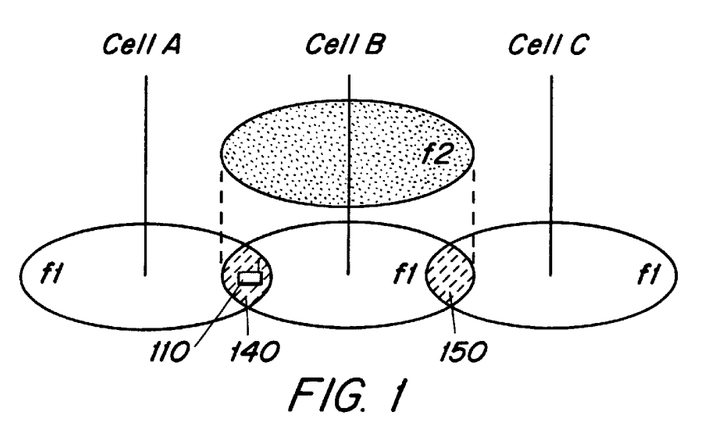
FIG. 1 illustrates a cellular system including three cells where one cell uses two frequency bands.

FIG. 1 illustrates another method used to reduce interference in a CDMA system. Cells A, B and C spread communication signals over a first frequency band $f_1$. The cells overlap each other at the shaded regions 140 and 150 so that there are minimal interruptions to an ongoing call during handover. Accordingly, when mobile station 110, which is communicating with a base transceiver station in cell A over frequency band $f_1$, moves from an area completely contained within cell A to shaded region 140, the connection between mobile station 110 and cell A will cause interference to connections in cell B, which also are communicating on frequency band $f_1$, until a connection is also establish to cell B. Transferring connection between cells which operate over the same frequency band is known as soft handoff.

Now consider a situation wherein, after the cellular system has been implemented, it is discovered that there is an increased demand for access to the channels allocated to cell B which, in turn, leads to an unacceptable level of interference. The area where the increased demand occurs is referred to in the art as a "hot spot". To reduce the interference associated with a highly loaded cell, a second frequency band $f_2$ can be assigned to the transmitter in cell B so that the transmitter in cell B can communicate with mobile stations on either frequency band $f_1$ or on frequency band $f_2$. Accordingly, when the system detects an increase in the load on frequency band $f_1$, which the system determines will lead to an unacceptable level of interference, the system can transfer some of the mobile stations over to frequency band $f_2$. Typically the determination of whether an increase in the load will lead to an unacceptable level of interference can be based on a predefined number of users on a particular frequency band, if the total output power used by the system exceeds a predetermined threshold, or if the total uplink interference caused by the mobile stations exceeds a predetermined threshold.

For example, assume that cell B is communicating with mobile stations on both frequency band $f_1$ and frequency band $f_2$, and cell A is communicating with mobile stations only on frequency band $f_1$. Assume further that mobile station 110 is communicating on frequency band $f_1$ with a base transceiver station in cell A and that frequency band $f_1$ in cell B is becoming congested. As the mobile station 110 moves further into the area of coverage of cell B and away from the area of coverage of cell A, the mobile station 110 or the cellular system will determine that mobile station 110's signal quality can be improved and the amount of interference cause to other mobile stations reduced if a connection between the mobile station 110 and a base transceiver station in cell B on frequency band $f_2$ is established. However, before the connection is handed off, mobile station 110 will cause interference to the mobile stations in cell B, since both mobile station 110 and the mobile stations in cell B will be transmitting over the same frequency band, i.e., frequency band $f_1$. Accordingly, although congestion is relieved in cell B, interference will still be caused to mobile stations in cell B which are operating on frequency band $f_1$.

Another alternative method for increasing system capacity while minimizing interference is through the use of localized microcells which may be established within overlying macrocells to handle areas with relatively dense concentrations of mobile users. Typically, microcells may be established for thoroughfares such as crossroads or streets, and a series of microcells may provide coverage of major traffic arteries such as highways. Microcells may also be assigned to large buildings, airports, and shopping malls. Microcells allow additional communication channels to be located in the vicinity of actual need, thereby increasing cell capacity while maintaining low levels of interference.

Implementation of microcells within a macrocell typically requires the use of separate frequencies for communication on the channels assigned to the microcell and for the channels assigned to the macrocell. Further, implementation of microcells within a macrocell requires separate transmitters, i.e., base transceiver stations, for communications on the channels assigned to the microcell and for channels assigned to the macrocell. These microcell transceivers typically have lower maximum transmit powers than macrocell transceivers and, accordingly, create relatively less interference through their transmissions. Although the use of microcells may reduce interference, the use of microcells also increases the cost of providing the additional channels by requiring the installation of additional transmitters and through increased costs of cell planning due to the complexity which results from the use of microcells. Further, since the transceivers for a microcell are not usually located in the same geographic area as the transceivers for the macrocells, there are increased maintenance costs associated with the geographic separation. In addition, although microcells may reduce the load on the macrocell and reduce the average power levels used by the mobile stations in the microcell, the microcell may also have to tolerate high levels of interference.

Accordingly, it would be desirable to increase the capacity of a cellular communications system without increasing excess interference to the existing connections in the cellular system. Further, it would be desirable to increase capacity in a cellular system without adding extra base transceiver stations and the associated added expenses. In addition, it would be desirable to allow a handoff into a cell with increased capacity which does not cause excess interference towards the existing connections in the cell.

SUMMARY

These and other problems associated with cellular communications are solved by the present invention, wherein a base transceiver station which communicates with mobile stations over a first and second frequency band uses a tailored range for the second frequency band in order to minimize interference. According to one embodiment of the present invention, the maximum range for the second frequency band is smaller than the maximum range for the first frequency band. According to another embodiment of the present invention, the maximum range for the second frequency band is greater than the maximum range for the first frequency band. According to yet another embodiment of the present invention, the maximum range of the second frequency band will vary depending upon the congestion of the first frequency band.

BRIEF DESCRIPTION OF THE DRAWINGS

The present invention will now be described with reference to the accompanying drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

In order to simplify the discussion of the present invention, the maximum range of frequency band $f_1$ will hereinafter be referred to as either the area of coverage of a cell, the cell boundary or, simply, the cell. Further, one skilled in the art will recognize that the maximum range of a frequency band, i.e., a base transceiver station's transmission on the frequency band, is the farthest distance where the mobile station can receive a signal which has a signal strength or quality above a predetermined threshold.

Although the following describes certain measurements and calculations being performed by a mobile station, one skilled in the art will recognize that the measurements and calculations can alternatively be performed in the cellular network. Further, although the following describes certain calculations being performed in the base transceiver station, one skilled in the art will recognize that these calculations may be performed in other parts of the cellular network, e.g., the radio network controller.

Figure 2:
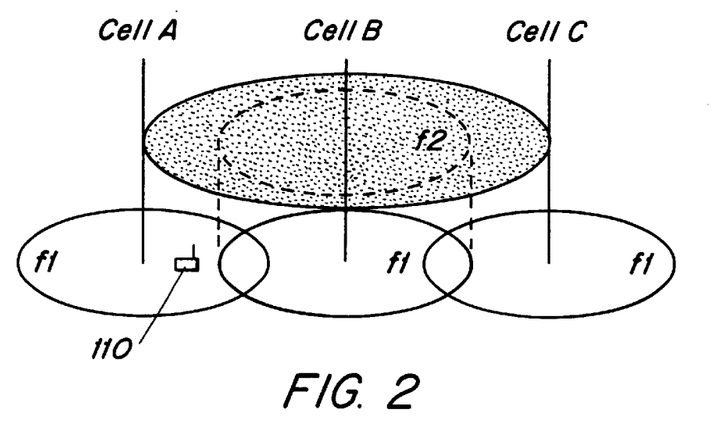
FIG. 2 illustrates a cellular system where one cell uses a second frequency band with an extended maximum range.

FIG. 2 illustrates a first exemplary embodiment of the present invention wherein the base transceiver station (not shown) uses a second frequency band f which has a maximum range which is greater than the maximum range of frequency band $f_1$ transmitted by the base transceiver station in cell B, i.e., the maximum transmit power of the base transceiver station in cell B on frequency band $f_2$ is greater than the maximum transmit power of the base transceiver station in cell B on frequency band $f_1$. Accordingly, the extended range frequency band $f_2$ is illustrated in FIG. 2 as extending into cells A and C. The extended range of frequency band $f_2$ will not significantly interfere with connections in cells A and C because those cells are using frequency band $f_1$ for their connections. Further, the extended range of frequency band $f_2$ allows for less interference to other connections during handoff. For example, if mobile station 110 is moving from cell A towards cell B, the mobile station 110, while communicating on frequency band $f_1$ in cell A, can handover to frequency band $f_2$ in cell B without having to come close enough to cell B to cause significant interference with frequency band $f_1$ in cell B.

Another advantage of the extended range hot spot is evident when the mobile station 110 is leaving cell B while communicating on a connection on frequency band $f_2$. Since frequency band $f_2$ extends into cell A the mobile station does not have to handoff to frequency band $f_1$ of cell A until the mobile station 110 is located in cell A. Accordingly, since the mobile station 110 has a connection on frequency band $f_2$, it will not cause significant interference to connections in cell A which are using frequency band $f_1$.

Prior to discussing additional exemplary handoff procedures according to the present invention, conventional handoff procedures are described below. In certain conventional CDMA systems control information is broadcast to mobile stations over a control channel or pilot channel. The control channel is divided between two separate physical channels, the common pilot channel (CPICH) and the primary common control physical channel (PCCPCH). For more information regarding control channels the interested reader should refer to U.S. patent application Ser. No. 09/112,689 entitled "Method, Apparatus, and System for Fast Base Station Synchronization and Sector Identification" filed Jul. 9, 1998, which is herein incorporated by reference. The CPICH is used by mobile stations to perform measurements, while the PCCPCH carries the broadcast control channel (BCCH). The BCCH delivers cell-specific information, e.g., cell identification and sector identification, system-related information, e.g., transmit power, uplink interference power, and cell specific neighboring cell information, e.g., scrambling codes used by neighboring cells, neighboring cells which mobile stations should make measurements upon, etc. In order for a mobile station to identify other base transceiver stations to handoff to, the mobile station identifies the CPICH channels for the surrounding base transceiver stations using the scrambling codes supplied as described above. Using these scrambling codes the mobile station can make continuous measurements of the CPICH channels associated with neighboring cells to identify potential base transceiver stations as handoff candidates.

In conventional CDMA systems when a mobile station is communicating using real time services such as speech, the mobile station is continuously transmitting and receiving. Accordingly, in typical CDMA systems a mobile station cannot make measurements on other frequencies without a second receiver. However, a second receiver adds to the weight and complexity of the mobile station. One proposed solution which allows a mobile station to make measurements on another frequency is to vary the duty cycle of transmissions to operate in a so-called "compressed mode". In the compressed mode the information in the traffic channel is compressed in time and sent in one or more shorter bursts than normal. Since the information on the traffic channel is received in less time, the mobile station can use the extra time to make measurements on other frequencies. However, using less time for the same amount of information means that a higher transmission rate must be used. The higher transmission rate leads to an increase in the amount of power used, and in turn, a greater amount of interference. Accordingly, it would be desirable to be able to make measurements on CPICH channels transmitted on other frequencies without an additional receiver and without using the compressed mode.

According to the present invention the CPICH channel for the second frequency band $f_2$ (CPICH channel 2) can be transmitted on frequency band $f_1$. For example, referring again to FIG. 2, CPICH channel 2 can, in addition to being transmitted on frequency band $f_2$, be transmitted on frequency band $f_1$ using the scrambling code of frequency band $f_1$. The base transceiver station can inform the mobile station via the BCCH of the channelization code for CPICH channel 2 which is being transmitted on frequency band $f_1$. Similarly, CPICH channel I for frequency band $f_1$ can be transmitted on frequency band $f_2$ using the same scrambling code used to transmit on frequency band $f_2$ but employing a different channelization code than the channelization code used to transmit CPICH channel 2 on frequency band $f_2$. Accordingly, a mobile station while communicating on a first frequency band is able to make measurements on CPICH channels which are associated with other frequency bands.

Another method for determining whether the second frequency band $f_2$ has an acceptable signal quality for a connection between a particular mobile station and base transceiver station can be referred to as the offset method. According to this method the mobile station, or the base transceiver station if the handoff decisions are made therein, is informed of the power level offset between the CPICH channel 1 transmitted on frequency band $f_1$ and the CPICH channel 2 on frequency band $f_2$. Since the mobile station is already measuring the CPICH channel 1 on frequency band $f_1$, the determination of whether the frequency band $f_2$ provides an acceptable signal quality can take into account this power level offset. For example, handoff decisions are typically based upon pathloss to the base transceiver station by subtracting the received CPICH channel power from the power at which the CPICH channel was transmitted from the base transceiver station. One skilled in the art will recognize that handoff decisions can also be based upon other parameters such as signal-to-noise ratio, received signal strength indicator (RSSI), delay, bit error rate (BER), frame error rate, (FER), or any combination of these parameters.

Accordingly, referring again to FIG. 2, mobile station 110 will measure the received power of CPICH channel 1. When the mobile station 110 is measuring CPICH channel 1 on frequency band $f_1$ in cell B, the CPICH channel can inform the mobile station 110 of the transmitted power of frequency band $f_1$ and the power offset between frequency band $f_1$ and frequency band $f_2$ in cell B. The mobile station 110 then calculates the pathloss for frequency band $f_1$. The mobile station 110 can estimate the pathloss for frequency band $f_2$ by adding or subtracting the offset value from the pathloss which the mobile station 110 determined for frequency band $f_1$ in cell B. A mobile station will decide to handoff from frequency band $f_1$ to frequency band $f_2$ when the pathloss measured on CPICH channel 1 has decreased below a certain threshold. Similarly, a mobile station will handoff from frequency band $f_2$ to frequency band $f_1$ when the pathloss measured on CPICH channel 2 sent on frequency band $f_2$ has increased above a certain threshold. One skilled in the art will readily recognize that similar thresholds can be implemented if the handoff decisions are based on RSSI, CPICH received signal code power (RSCP), pathloss based on CPICH RSCP, and CPICH energy per chip divided by the total received power density (Ec/No).

Figure 3:
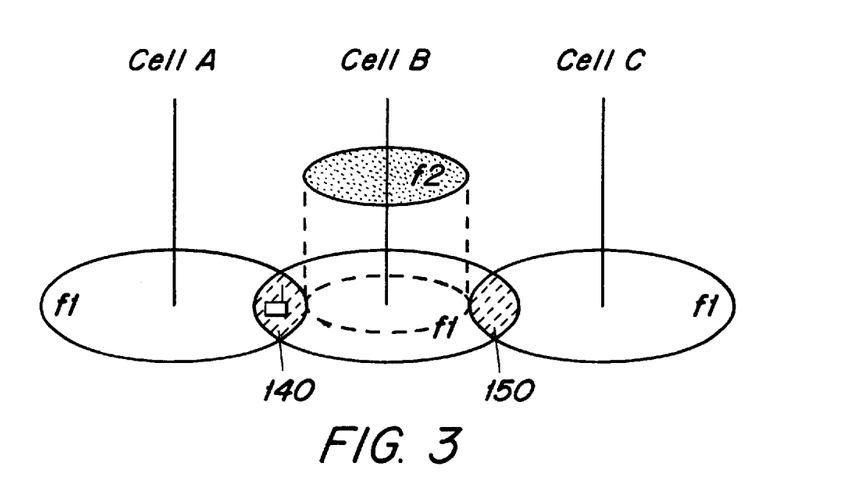
FIG. 3 illustrates a cellular system where one cell uses a second frequency band with a reduced maximum range.

FIG. 3 illustrates another exemplary embodiment of the present invention wherein the base transceiver station in cell B communicates over a frequency band $f_2$ which has a maximum range which is smaller than the maximum range of frequency band $f_1$, i.e., wherein the maximum transmit power for the base transceiver station on frequency band $f_2$ is less than the maximum transmit power of the base transceiver station on frequency band $f_1$. Alternatively, the maximum range of frequency bands $f_1$ and $f_2$ can be adjusted by changing the threshold for handing a mobile station over from one base transceiver station to another. According to a purely exemplary embodiment of the present invention, the maximum range of frequency band $f_2$ is set such that the border of frequency band $f_2$ does not extend into overlap areas 140 and 150. Since the maximum range of frequency band $f_2$ does not extend into overlap areas 140 and 150, a mobile station which has a connection on frequency band $f_2$ in cell B can switch over to frequency band $f_1$ in cell B without significantly interfering with connections on frequency band $f_1$ of cell A, because when the mobile station switches from one frequency band to the other frequency band the mobile station will not be close enough to the boundaries of cell A to cause significant interference. In contrast, in conventional systems where frequency bands $f_1$ and $f_2$ have the same maximum range, the mobile station could switch from frequency band $f_2$ in cell B to frequency band $f_1$ in cell B while in overlap area 140 and the mobile station would then transmit on frequency band $f_1$ in cell B and cause interference to co-channel (code) users of frequency band $f_1$ in cell A.

Assume now that mobile station 110 is communicating on frequency band $f_2$ with a base transceiver station in cell B. The mobile station 110 can determine that if the pathloss estimate goes above, for example, 71$d$B, the mobile station 110 will handoff to frequency band $f_1$, because frequency band $f_1$ has a higher signal strength value. Further, if the mobile station 110 is communicating on frequency band $f_1$ and the pathloss estimate falls below, for example, 69$d$B the mobile station 110 will handoff to frequency band $f_2$ in cell B because it is possible for mobile station 110 to use a lower signal power while maintaining the same signal quality. One skilled in the art will recognize that this exemplary 2$d$B difference between the handoff thresholds, known as hysteresis, avoids the ping-pong effect of the mobile station 110 performing continuous handoffs to achieve minimal increased signal reception. If the base transceiver station performs the handoff calculations then the base transceiver station will determine whether the pathloss estimate exceeds the thresholds described above. In addition, although the example above uses only two frequency bands, one skilled in the art will recognize that the thresholds described above are equally applicable to systems with more than two frequency bands.

Accordingly, the thresholds described above will have the effect that a majority of the mobile stations which are located within the range of the smaller "cell" will be communicating on frequency band $f_2$, while all other mobile stations which are communicating with the base transceiver station in cell B will be communicating on frequency band $f_1$. Further, if the system is making the handoff determinations, the system can group mobile stations which are within the range of frequency band $f_2$ and communicating on frequency band $f_1$ into a set of handoff candidates. The actual handoff is triggered by the load or amount of interference on frequency band $f_1$ and the base transceiver station orders mobile stations in the handoff candidate group to handoff to frequency band $f_2$. Other criteria for selecting mobile stations which should handoff to frequency band $f_2$ when interference begins to affect communication on frequency band $f_1$ include choosing mobile stations which are moving with the lowest speed as candidates for frequency band $f_2$, choosing mobile stations which are closest to the base transceiver station as candidates for frequency band $f_2$, choosing mobile stations which are moving towards the base transceiver station as candidates for frequency band $f_2$, choosing mobile stations based upon time spent in the cell, or a combination of any of the criteria described above. One skilled in the art will recognize that the above described other criteria for determining handoffs are equally applicable to all of the embodiments of the present invention.

An additional advantage to the use of a reduced maximum range for the second frequency band $f_2$ is the increased capacity and flexibility over conventional systems which use only a single frequency band. For instance, a system can have enough mobiles in communication on the second frequency band $f_2$ such that resources on the first frequency band $f_1$ can be reserved to provide more robust communications and can better handle situations such as when a fast moving mobile station suddenly enters the cell.

Figure 4:
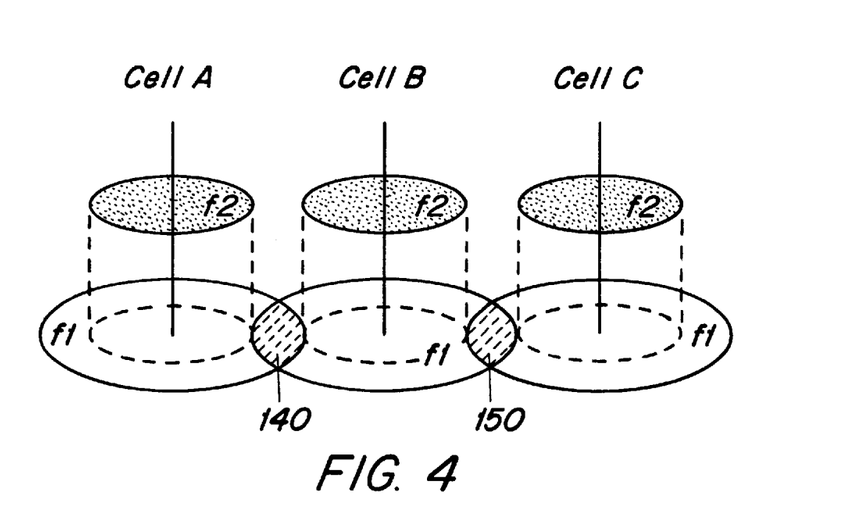
FIG. 4 illustrates a cellular system where all three cells use a second frequency band with a reduced maximum range.

The limited range for a second frequency band shown in FIG. 3 can be extended such that more than one or all of the cells in a communications system use a second frequency band $f_2$ which has a limited range, as illustrated in FIG. 4. Accordingly, the second frequency band $f_2$ in cells A, B and C have a maximum range set such that none of the frequency bands provide coverage of overlap areas 140 and 150. Since none of the second frequency bands overlap, the second frequency bands do not cause interference towards each other. Accordingly, the configuration of FIG. 4 allows all of the cells to have the advantages described above without additional interference between the second frequency bands $f_2$ in each cell.

Further, one skilled in the art will recognize that depending upon various radio communication conditions, e.g., radio wave propagation, line of sight conditions, some overlap between the second frequency bands $f_2$ in cells A, B and C may occur. If such an overlap exists when a mobile station is moving between cells, the system should handoff the mobile station from one of the cell's frequency band $f_2$ to another one of the cell's frequency band $f_2$. For example, referring again to FIG. 4, assume that a mobile station is moving from the center of cell B towards cell A and is communicating on frequency band $f_2$ with the base transceiver station in cell B. Further, assume that the due to the radio communication conditions there exists some overlap between the maximum range of the frequency band $f_2$ in cell B and the maximum range of the frequency band $f_2$ in cell A. Since it is generally preferable to perform soft handoff rather than a hard handoff, the mobile station will handoff from frequency band $f_2$ in cell B to frequency band $f_2$ in cell A if it is determined that the frequency band $f_2$ in cell A provides the mobile station with an acceptable quality signal. In addition, one skilled in the art will recognize that soft handoff can be implemented in all embodiments of the present invention where there is an overlapping maximum range of the same frequency band in neighboring cells.

Figure 5A:
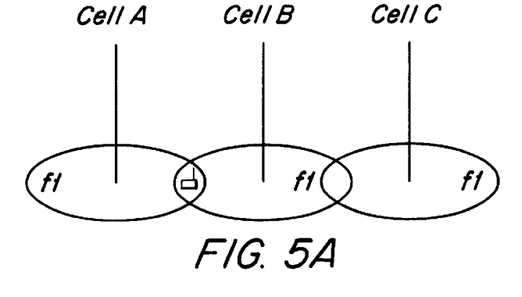
FIGS. 5A-5D illustrate a cellular system where the second frequency band has a maximum range which is a function of the capacity of the first frequency band and of the interference on the first frequency band.
Figure 5B:
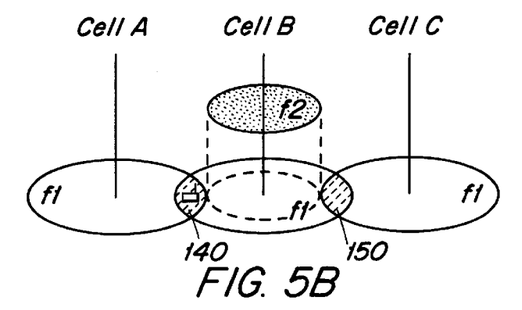

FIGS. 5A–5D illustrate another exemplary embodiment of the present invention where the maximum range of frequency band $f_2$ varies as a function of the current or anticipated capacity available on frequency band $f_1$ and the amount of interference in frequency band $f_1$. Accordingly, if there is no need for an additional frequency band, e.g., when frequency band $f_1$ has enough capacity for all current connections, frequency band $f_2$ is not used, as illustrated in FIG. 5A. The system determines whether there is sufficient capacity on frequency band $f_1$ by evaluating the amount of interference in frequency band $f_1$ and the number of current connections on frequency band $f_1$, reserving a portion of the maximum capacity so that there is enough capacity for mobile stations to handoff to frequency band $f_1$. As the loading on frequency band $f_1$ increases, and in turn, the interference caused to mobiles operating on the frequency band increases, the base transceiver station activates frequency band $f_2$ and sets the maximum power of frequency band $f_2$ to a minimum power level as illustrated in FIG. 5B. The minimum power level is chosen such that there is enough area in the cell for mobile stations which are communicating on frequency band $f_2$ to move around without having to immediately handoff back to frequency band $f_1$. Since frequency band $f_2$ is designed to relieve the load and interference on frequency band $f_1$, the minimum power level is set to a level where the interference in frequency band $f_1$ is lowered by reducing the number of mobile stations communicating on $f_1$ through handoff to frequency band $f_2$. Further, the power level of frequency band $f_2$ is set such that frequency band $f_1$ has sufficient capacity to handle mobile stations which attempt to handover to frequency band $f_1$.

Figure 5C:
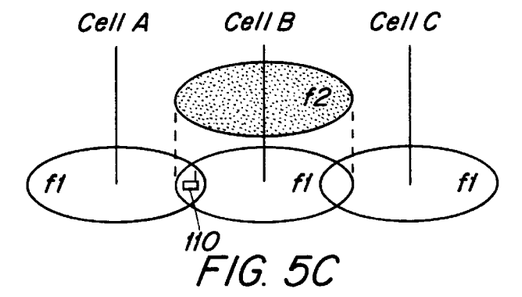
Figure 5D:
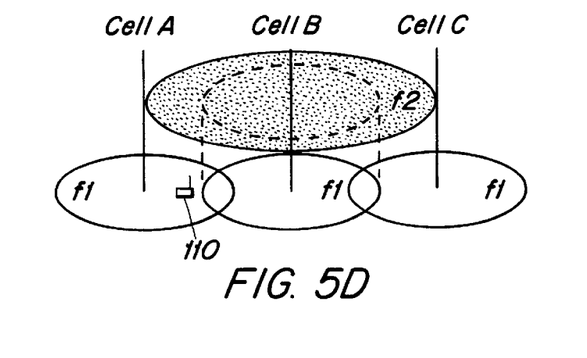

As the number of mobiles operating in cell B increases further, the maximum range of frequency band $f_2$ can be increased, as illustrated in FIGS. 5C and 5D. This increase can be gradual or in predetermined steps. Similarly, as the demand for capacity decreases in cell B, the maximum range of frequency band $f_2$ will shrink. Since inter-frequency handover causes more disturbance to a call than soft handover, it is desirable to allow as many mobiles as possible to remain connected on frequency band $f_1$ while frequency band $f_2$ is expanding and contracting.

Figure 6:
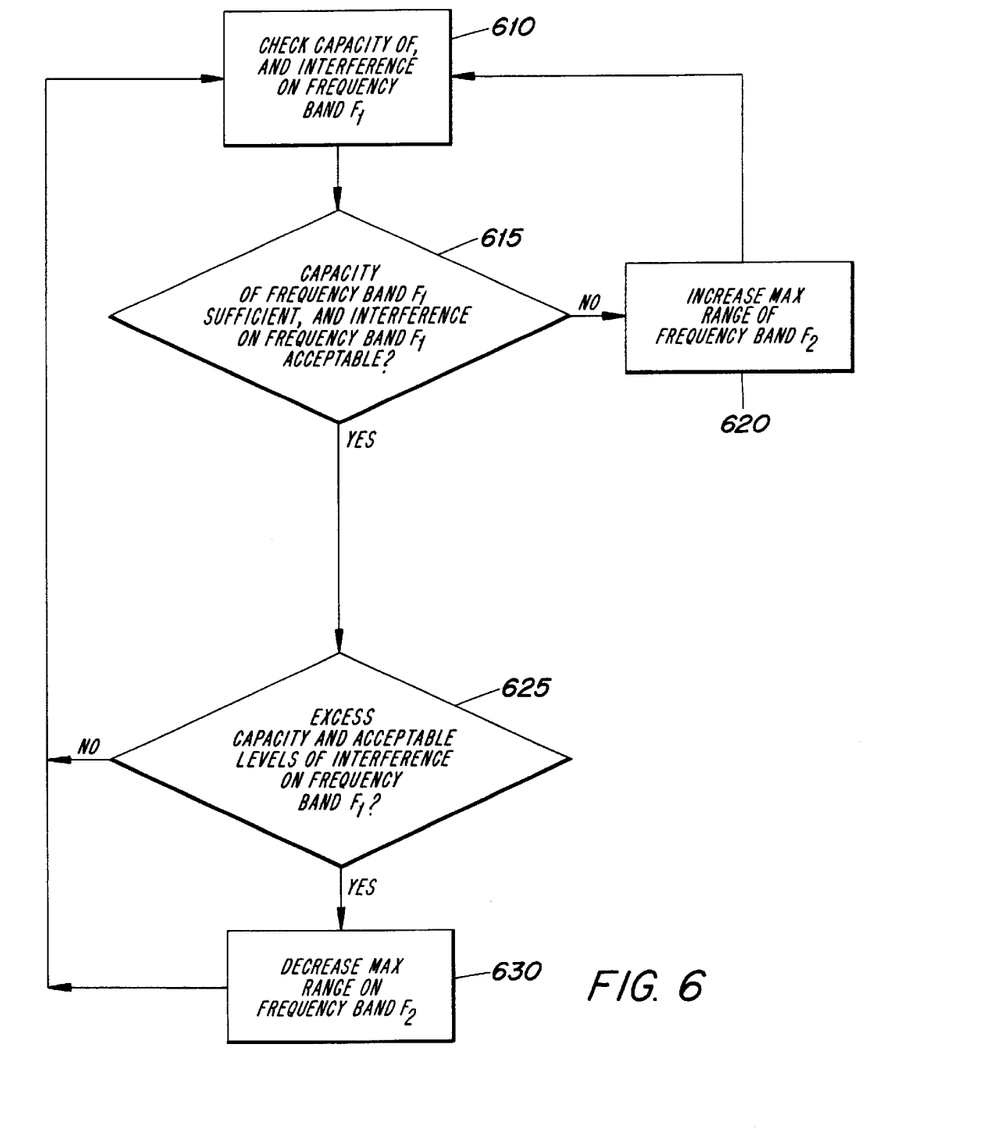
FIG. 6 illustrates an exemplary method for varying the maximum range of the second frequency band.

FIG. 6 illustrates an exemplary method for varying the maximum range of frequency band $f_2$. In step 610, the capacity of, and the interference on, frequency band $f_1$ is checked. In step 615 it is determined whether the current capacity of frequency band $f_1$ is sufficient given the number of connections which are established and whether the level of interference on frequency band $f_1$ is at an acceptable level. The determination of sufficient capacity of frequency band $f_1$ includes a margin so that there is sufficient excess capacity for mobile stations which subsequently enter cell B to communicate across frequency band $f_1$. If the capacity is not sufficient or if there is an unacceptable level of interference in frequency band $f_1$, in accordance with the "No" path out of decision step 615, then the maximum range of frequency band $f_2$ is increased in accordance with step 620. According to a purely exemplary embodiment of the present invention, an increase in the maximum range of frequency band $f_2$ is illustrated by changing frequency band $f_2$ from the maximum range in FIG. 5C to the maximum range in FIG. 5D. If frequency band $f_2$ is not currently being used by the base transceiver station in cell B, then in step 620 frequency band $f_2$ is activated and set to a predetermined minimum maximum range, as illustrated by moving from FIG. 5A to FIG. 5B. After the maximum range of frequency band $f_2$ has been increased, then the system returns to step 610 to check the capacity of frequency band $f_1$.

If the capacity of frequency band $f_1$ is sufficient and the level of interference in frequency band $f_1$ is acceptable, in accordance with the "Yes" path out of decision step 615, then it is determined whether there is excess capacity on frequency band $f_1$ in accordance with step 625. If there is excess capacity on frequency band $f_1$, e.g., if there are some predetermined number of channels not currently in use on band $f_1$, in accordance with the "Yes" path out of decision step 625, then the maximum range of frequency band $f_2$ is decreased in accordance with step 630. The determination of excess capacity should also account for a number of connections for mobile stations which may handoff to frequency band $f_1$. According to a purely exemplary embodiment of the present invention, the decrease in the maximum range of frequency band $f_2$ is illustrated by changing frequency band $f_2$ from the maximum range in figure 5C to the minimum range in FIG. 5B. If frequency band $f_2$ is already set to a minimum output transmit power when it is determined that there is excess capacity on frequency band $f_1$ and there are no mobile stations using frequency band $f_2$, then the base transceiver station can opt to cease using the frequency band $f_2$, as illustrated by moving from FIG. 5B to FIG. 5A. After the maximum range of frequency band t has been decreased, the system returns to step 610 to check the capacity of, and interference on, frequency band $f_1$. Similarly, if it is determined that there is not excess capacity on frequency band $f_1$, in accordance with the "No" path out of decision step 625, then the system returns to step 610 to check the capacity of, and amount of interference on, frequency band $f_1$. One skilled in the art will recognize that before the maximum range of frequency band $f_2$ is reduced any mobile stations which would be dropped due to the decreased range may be ordered to perform a handoff to frequency band $f_1$.

Figure 7:
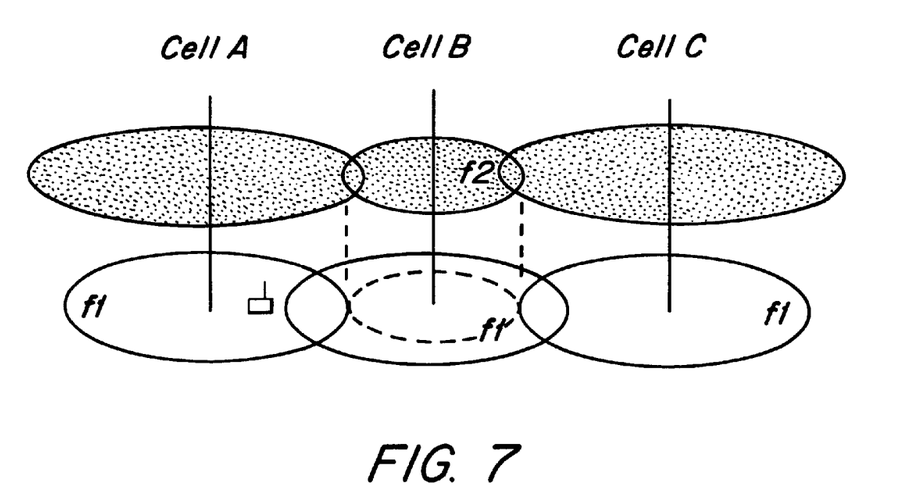
FIG. 7 illustrates a cellular system where one cell has a second frequency band with a reduced maximum range and two cells have a second frequency band with an extended maximum range.

FIG. 7 illustrates another exemplary embodiment of the present invention in which the techniques described in regard to FIGS. 2 and 3 are used by neighboring cells. Accordingly, cells A and C use an extended range for frequency band $f_2$, where the maximum range of frequency band $f_2$ extends into cell B. Cell B uses a reduced range for frequency band $f_1$ where the maximum range of frequency band $f_2$ does not extend into overlap areas 140 and 150. The embodiment illustrated in FIG. 7 provides slightly different locations where handover can be performed for frequency band $f_1$ and for frequency band $f_2$. This combination of extended and limited range for frequency band $f_2$ can be used to host high data-rate users which normally reside close to the site (provided by the smaller $f_2$ cell). By providing the extended range frequency band $f_2$ in cells A and C, these high data-rate users can leave cell B without causing any disturbance to connections on frequency band $f_1$.

Figure 8A:
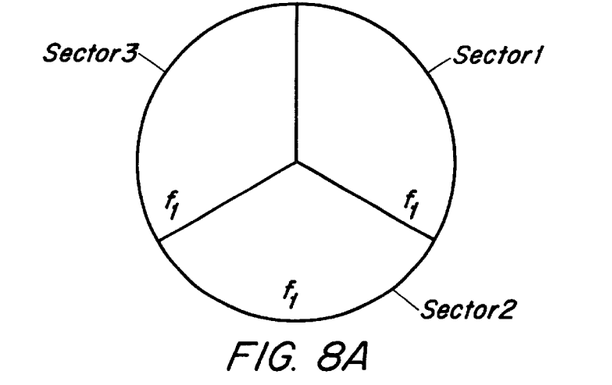
FIGS. 8A–8C illustrate exemplary embodiments of the present invention in a sectorized cell.
Figure 8B:
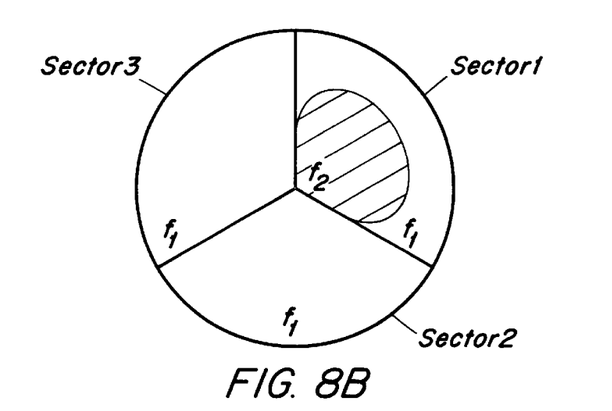

Although the present invention has been described with reference to single sector cells, the present invention is equally applicable to multisector cells such as those shown in FIGS. 8A-8C. FIG. 8A illustrates an exemplary three sector cell serviced by three sector antennas (not shown) in a CDMA system where each sector operates using a first frequency band $f_1$. Although the sectors are illustrated as having definite cell boundaries, one skilled in the art will recognize that there will be an overlap in the area of coverage between each sector in order to provide handover with minimal interruption to an ongoing call. FIG. 8B illustrates an exemplary three sector cell where a second frequency band $f_2$ has a reduced maximum range in sector 1. The maximum range of frequency band $f_2$ in FIG. 8B is set such that frequency band $f_2$ does not extend into the areas of coverage of sectors 2 and 3, including any overlap areas which are not shown. The embodiment illustrated in FIG. 8B offers advantages similar to those offered by the reduced maximum range embodiment illustrated in FIG. 3. Further, similar to FIG. 4, each sector of FIG. 8B can use a frequency band $f_2$ with the reduced maximum range where each sector can obtain the benefits offered by the reduced second frequency band.

Figure 8C:
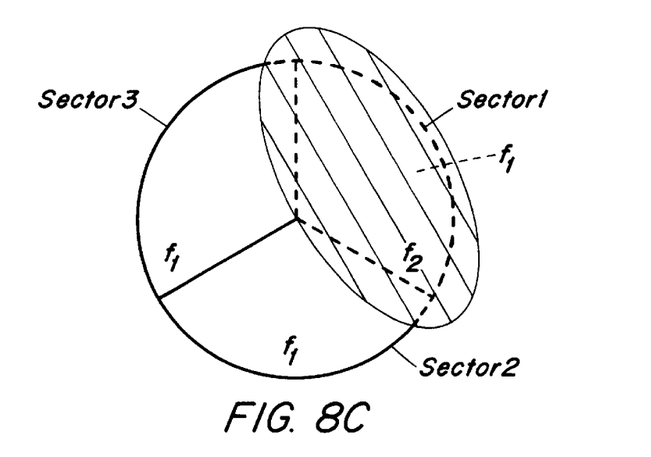

FIG. 8C illustrates an extended frequency band $f_2$ which originates from the antenna and transmitter responsible for broadcasting frequency band $f_1$ in sector 1, but frequency band $f_2$ has a maximum range which overlaps into sectors 2 and 3. The extended range second frequency band $f_2$ in a sectorized cell offers advantages similar to the extended range frequency band $f_2$ illustrated in FIG. 2 in a single sector cell. In addition, the "controlled breathing" embodiment of the present invention which was described above in FIGS. 5A-5D in regard to a single sector cell can be implemented in a multisector cell. For more information regarding sectorized cells, antennas and transmitter arrangements for sectorized cells, the interested reader is referred to U.S. patent application Ser. No. 09/053,951 "Method and System for Handling Radio Signals in a Radio Base Station", the disclosure of which is expressly incorporated here by reference.

In sectorized cells a mobile station can communicate with several sectors on frequency band $f_1$ using a technique known as softer handoff. For more information regarding sectorized cells and softer handoff the interested reader should refer to U.S. patent application Ser. No. 09/112,689 entitled "Method, Apparatus, and System for Fast Base Station Synchronization and Sector Identification" filed Jul. 9, 1998, which is herein incorporated by reference. When the mobile station is communicating with several sectors on frequency band $f_1$ the pathloss to the base transceiver station can be estimated by using the lowest pathloss among all sectors in the cell that the mobile station is communicating with. This technique can avoid the afore described "ping-pong" effect when a mobile station is moving from, for example in FIG. 8B, frequency band $f_2$ to frequency band $f_1$ because the handoff decision may be based on a path with many reflections. These reflections are the result of the base transceiver station signals bouncing off objects, such as buildings, before reach the mobile station which can result in a pathloss value which is higher than the pathloss value should be based upon the distance of the mobile from the base transceiver station. Since interfrequency handoff can result in greater disturbances and a greater likelihood of dropped call than intrafrequency handoff, while a mobile station is communicating on frequency band $f_2$ handoff to frequency band $f_1$ should be avoided as long as one sector is good enough to maintain the communication.

Figure 9:
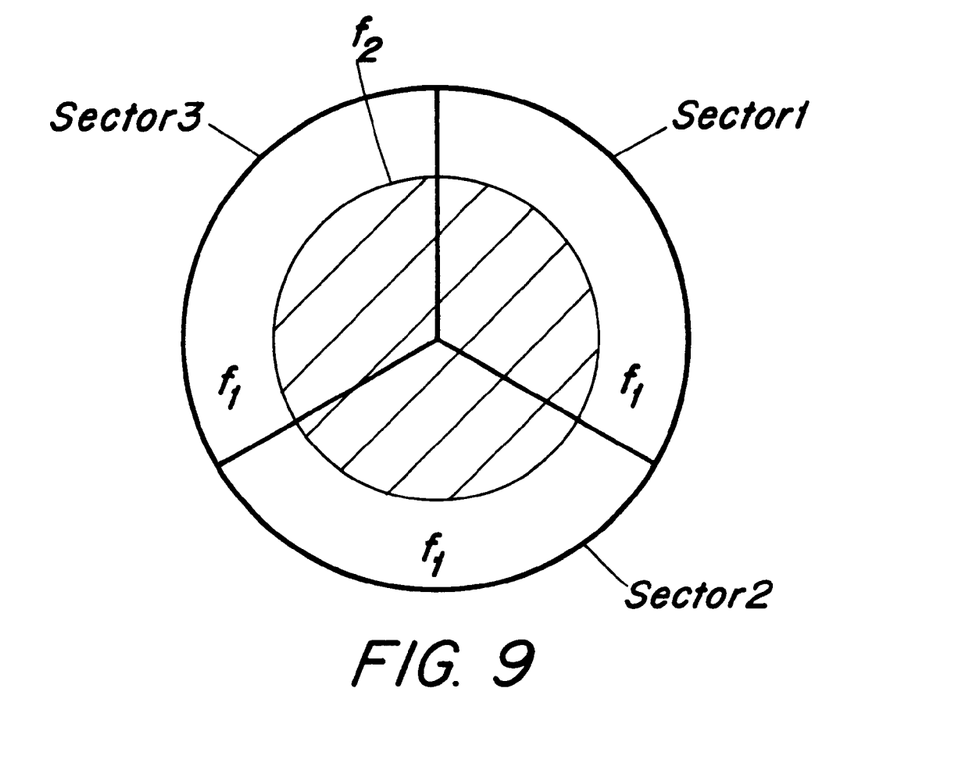
FIG. 9 illustrates a first frequency band which is sectorized and a second frequency band which is omnidirectional.

FIG. 9 illustrates a cell with three sectors for carrying frequency band $f_1$, while frequency band $f_2$ is transmitted using an omnidirectional transmission scheme. According to this embodiment mobile stations which are communicating on frequency band $f_2$ can move around the base transceiver station without having to perform a soft handoff. The omnidirectional second frequency band $f_2$ leads to less load on the network due to less signaling, especially when a mobile station is moving close to the center of the cell. In addition, the omnidirectional second frequency band $f_2$ allows for a less complex power control scheme to be used, which can lead to the need for less resources. For example, a less complex power control scheme could be to use a fixed power on the downlink.

Although some portions of the present invention have been described as implementing mobile controlled handover, one skilled in the art will recognize that network controlled handover could be implemented instead.

The present invention has been described by way of exemplary embodiments to which the invention is not limited. Modifications and changes will occur to those skilled in the art without departing from the spirit and scope of the invention as defined in the appended claims.

What is claimed is:

1. A base transceiver station in a Code Division Multiple Access (CDMA) communications system, comprising:
   a transmitter capable of transmitting signals over a first frequency band and a second frequency band, wherein said first and second frequency bands are traffic channels;
   interference measuring means for determining whether said first frequency band has sufficient capacity for all current connections (mobile stations);
   activation means for activating said second frequency band if interference in said first frequency band exceeds a predetermined threshold; and
   means for effecting a soft handoff of a mobile station between said first frequency band and said second frequency band for reducing interference in said first frequency band, wherein the range of said second frequency band overlaps said first frequency band that is transmitted from an adjoining base transceiver station.

2. The base transceiver station of claim 1, wherein said first frequency band has a first maximum range that defines the boundaries of a first cell.

3. The base transceiver station of claim 1, wherein said first frequency band has a first maximum range that defines the boundaries of one sector in a multi-sector cell.

4. The base transceiver station of claim 1, wherein said base transceiver station transmits a control channel for said second frequency band on said first frequency band.

5. The base transceiver station of claim 1, wherein said base transceiver station transmits information regarding said first frequency band and said second frequency band to said mobile station and said mobile station calculates an offset value based on said transmitted information.

6. The base transceiver station of claim 1, wherein said base transceiver station calculates an offset value as a function of the difference in power levels between said first frequency band and said second frequency band.

7. The base transceiver station of claim 6, wherein said base transceiver station calculates a pathloss estimate for the control channel for said second frequency on said first frequency band.

8. The base transceiver station of claim 4, wherein said mobile station calculates a pathloss estimate for the control channel for said second frequency band on said first frequency band.

9. The base transceiver station of claim 6, wherein said mobile station calculates the pathloss estimate using the offset value.

10. The base transceiver station of claim 1, wherein said first frequency band and said second frequency band each comprise a plurality of frequencies.

11. The base transceiver station of claim 10, wherein the plurality of frequencies in said first frequency band are exclusive of the plurality of frequencies in said second frequency band.

12. A Code Division Multiple Access (CDMA) cellular communication system, comprising:
   a base transceiver station of a first cell capable of:
      transmitting signals over a first frequency band and a second frequency band, said first frequency band having a first maximum range; and said second frequency band having a second maximum range, said second frequency band maximum range overlapping said first frequency band that is transmitting from an adjoining base transceiver station, wherein said first and second frequency bands are traffic channels; and
      adjusting said maximum range of each of said first and second frequency band;
   a mobile station capable of communicating over said first and second frequency bands;
   interference measuring means for determining whether said first frequency band has sufficient capacity for all current connections;

activation means for activating said second frequency band if interference in said first frequency band exceeds a predetermined threshold; and means for effecting a soft handoff of said mobile station between said first frequency band and said second frequency band in said first cell prior to crossing a boundary between said first cell and a second cell to lower said interference in said first frequency band.

13. The cellular communication system of claim 12 further comprising at least one other base transceiver station which transmits signals across said first frequency band with said first maximum range and across said second frequency band with said second maximum range, wherein said first and second maximum ranges overlap and wherein said second maximum range is smaller than said first maximum range.

14. The cellular communications system of claim 12, wherein said second maximum range coverage area does not overlap coverage as from frequency bands associated with other base transceiver stations.

15. The cellular communication system of claim 12, wherein said first maximum range defines the boundaries of a first cell.

16. The cellular communication system of claim 12, wherein said first maximum range defines the boundaries of one sector in a multisector cell.

17. The cellular communication system of claim 12, wherein said base transceiver station transmits a control channel for said second frequency band on said first frequency band.

18. The cellular communication system of claim 12, wherein said base transceiver station calculates an offset value as a function of said difference in power levels between said first frequency band and said second frequency band.

19. The cellular communication system of claim 17, further comprising a mobile station, wherein said mobile station calculates a pathloss estimate for the control channel for said second frequency band on said first frequency band.

20. The cellular communication system of claim 18, further comprising a mobile station, wherein said mobile station calculates a pathloss estimate using the offset value.

21. The cellular communication system of claim 12, wherein said first frequency band and said second frequency band each comprise a plurality of frequencies.

22. The cellular communication system of claim 21, wherein the plurality of frequencies in said first frequency band are exclusive of the plurality of frequencies in said second frequency band.

23. In a base transceiver station in a Code Division Multiple Access (CDMA) communications system, a method for minimizing interference comprising the steps of:

determining whether a first frequency band has sufficient capacity for all current connections (mobile stations) by measuring the interference in said first frequency band;

activating a second frequency band if the interference in said first frequency band exceeds a predetermined threshold, wherein said first and second frequency bands are traffic channels;

reducing the number of mobile stations communicating on said first frequency band through soft handoff to said second frequency band; and adjusting the ranges of said first and second frequency bands according to the number of connected mobile stations wherein said second frequency band is adjusted to overlap said first frequency band transmitting from an adjoining base transceiver station.

24. The method of claim 23, wherein said base transceiver station does not transmit over said second frequency band if said first frequency band has sufficient capacity.

25. The method of claim 23, wherein said first frequency band has sufficient capacity when additional connections on said first frequency band do not cause excessive interference to existing connections on said first frequency band.

26. The method of claim 23, wherein a maximum range of said second frequency band also varies based upon the location of said connected mobile stations.

27. A method for minimizing interference in a Code Division Multiple Access (CDMA) wireless communication system comprising the steps of:

transmitting signals across a first frequency band with a first maximum range;

transmitting signals across a second frequency band with a second maximum range wherein said first and second frequency bands are traffic channels; and instructing a mobile station to handoff from said first frequency band to said second frequency band based upon a predetermined criteria, wherein the maximum range of the second frequency band is greater than said maximum range of said first frequency band and overlaps said first frequency band that is transmitting from an adjoining base transceiver station of said wireless communication system.

28. The method of claim 27, wherein said predetermined criteria comprises the speed at which a mobile station is traveling.

29. The method of claim 27, wherein said predetermined criteria is the proximity of a mobile station to a base transceiver station which transmits said first and second frequency bands.

30. The method of claim 27, wherein said predetermined criteria comprises the direction that a mobile station is traveling.

* * * * *